(12) United States Patent
Lopez

(10) Patent No.: US 11,052,554 B2
(45) Date of Patent: Jul. 6, 2021

(54) HAIR SHAVING DEVICE

(71) Applicant: Ricky D. Lopez, Las Vegas, NV (US)

(72) Inventor: Ricky D. Lopez, Las Vegas, NV (US)

( * ) Notice: Subject to any disclaimer, the term of this patent is extended or adjusted under 35 U.S.C. 154(b) by 151 days.

(21) Appl. No.: 16/375,787

(22) Filed: Apr. 4, 2019

(65) Prior Publication Data

US 2020/0316797 A1    Oct. 8, 2020

(51) Int. Cl.
| | | |
|---|---|---|
| *B26B 21/40* | (2006.01) | |
| *B26B 21/52* | (2006.01) | |
| *B26B 21/46* | (2006.01) | |
| *H04N 5/225* | (2006.01) | |
| *H04N 7/18* | (2006.01) | |
| *B26B 21/22* | (2006.01) | |

(52) U.S. Cl.
CPC ........ *B26B 21/405* (2013.01); *B26B 21/4062* (2013.01); *B26B 21/46* (2013.01); *B26B 21/521* (2013.01); *B26B 21/522* (2013.01); *B26B 21/526* (2013.01); *H04N 5/2256* (2013.01); *H04N 7/183* (2013.01); *B26B 21/225* (2013.01)

(58) Field of Classification Search
CPC ... B26B 21/405; B26B 21/4056; B26B 21/46; B26B 21/521; B26B 21/522; B26B 51/523; B26B 51/526; B26B 21/04; B26B 21/14; B26B 21/16; B26B 21/165; B26B 21/22; B26B 21/222; B26B 21/225; B26B 21/40; B26B 21/4012
See application file for complete search history.

(56) References Cited

U.S. PATENT DOCUMENTS

| | | | | |
|---|---|---|---|---|
| 2003/0177648 | A1* | 9/2003 | Zeiter | B26B 21/523 30/526 |
| 2010/0186234 | A1* | 7/2010 | Binder | H04N 5/3698 30/34.05 |
| 2015/0103158 | A1* | 4/2015 | Burris | H04N 5/2257 348/82 |
| 2016/0136826 | A1* | 5/2016 | Gers-Barlag | B26B 21/52 30/529 |
| 2017/0231738 | A1* | 8/2017 | Severson | A61F 2/004 600/31 |

FOREIGN PATENT DOCUMENTS

KR           201005595 A   *  5/2010

* cited by examiner

*Primary Examiner* — Daniel J Colilla
(74) *Attorney, Agent, or Firm* — Invention To Patent Services; Alex Hobson

(57) ABSTRACT

A device including a razor hosting portion having a combination of one or more blades operable for removing unwanted hair; an elongated handle configured to be operable for increasing a reach of a user; a camera implement configured to capture an area serviced by the razor hosting portion; a lighting piece implement configured to illuminate the area serviced by the razor hosting portion; a first gripping area with a grip enhancing texture material; a swivel head section including a swivel head with a spherical portion configured to allow the razor hosting portion to move and contour in multiple directions; a support bracket configured to surround the swivel head spherical portion; and a support arm implement extending from an end portion of the handle implement, wherein the support arm implement is configured to engage the swivel head implement.

18 Claims, 7 Drawing Sheets

HAIR SHAVING DEVICE

CROSS-REFERENCE TO RELATED APPLICATIONS

Not applicable.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to shaving devices. More particularly, certain embodiments of the invention relate to hair shaving devices.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. Approximately three-quarters of the U.S. population, ages six and up, are regularly active in a wide range of sports and recreational physical activities. This 72.4 percent equals roughly 219 million people. Over 43 percent of all Americans (about 130 million) engage in these activities at least once a week, indicating regularity in participation and devotion to their sports. The types of activities that many people engage in are very relevant to the hair shaving device.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that those who participate in competitive swimming and diving, for example, commonly body-shave to reduce the drag body hair can create, and which may reduce speed in the water. The process may also remove dead skin cells from the body, which makes contact with the water feel more invigorating. There are about 21.8 million Americans who may engage in competitive water sports. Body shaving to improve speed may be done in non-water sports, such as cycling. The number of Americans engaged in competitive and long-distance cycling—not the ordinary recreational or transportational type that many people use their bikes for—is an impressive 8.3 million. These two numbers more than double when combined with other relevant sporting activities. For example, body shaving is commonly done by those engaged in bodybuilding sports, and because the absence of hair makes muscular development more visible and specific to the eye. The number engaged in this activity is another 34 million Americans.

When athletes shave their legs, chest, arms and armpits, a shaving device may be needed. When shaving faces, aid from a mirror may be needed to help through the process. When it comes to shaving backs, though? That's when independence is lost. By reaching over the shoulder with a tiny-handled razor, the neck and the tops of shoulders may be covered. Reaching around might get the outer sides of the lower back. The middle area, however, from the lower shoulder blades to the center of the back and downward, may not be reached. Even if those areas could be accessed, the progress of the shave may not be seen. Missed spots here and there may be common. Use of two mirrors may be possible, such as holding a handheld mirror in one hand while the back faces a larger mirror. The distance and non-magnifying quality of the mirror image would still make hair hard to see, and wouldn't be much help. Those patches of hair missed by the shaving device would become more visible to others, simply due to the oddity in appearance. Appearances may become negative to everyone, having the opposite result of what may be intended from a back-shaving task. It may be too difficult to independently complete the task of back shaving.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
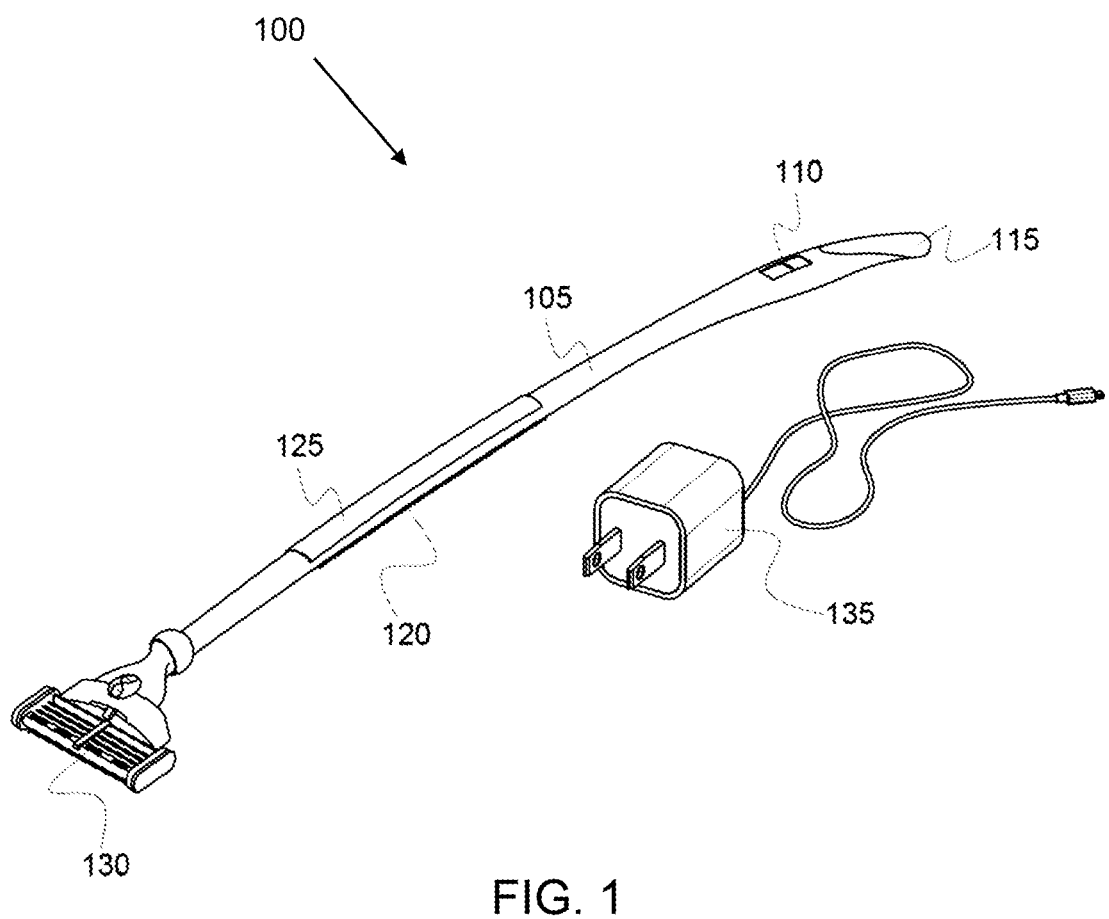
FIG. 1 is an illustration of an exemplary hair shaving device, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.*, 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp.* v. *Medtronic AVE, Inc.*, 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.*, 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C.* v. *Vector Distrib. Sys., Inc.*, 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see *Epcon*, 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.*, 279 F.3d 1022 (Fed. Cir. 2002) (construing the terms "substantially constant" and "substantially below"); *Zodiac Pool Care, Inc.* v. *Hoffinger Indus., Inc.*, 206 F.3d 1408 (Fed. Cir. 2000) (construing the term "substantially inward"); *York Prods., Inc.* v. *Cent. Tractor Farm & Family Ctr.*, 99 F.3d 1568 (Fed. Cir. 1996) (construing the term "substantially the entire height thereof"); *Tex. Instruments Inc.* v. *Cypress Semiconductor Corp.*, 90 F.3d 1558 (Fed. Cir. 1996) (construing the term "substantially in the common plane"). In conducting their analysis, the court instructed to begin with the ordinary meaning of the claim terms to one of ordinary skill in the art. *Prima Tek*, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac*, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.*, 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.*, 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.*, 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.*, 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.*, 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp.* v. *Micron Seps.*, 66 F.3d 1211, 1217, 36 USPQ2d 1225, 1229 (Fed. Cir. 1995); see, e.g., *Andrew Corp.* v. *Gabriel Elecs. Inc.*, 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see *Ex parte Mallory*, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re *Hutchison*, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, are generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" and "consisting of" limits the scope of a claim to the specified elements or method steps, plus those that do not materially affect the basis and novel characteristic(s) of the claimed subject matter (see *Norian Corp.* v *Stryker Corp.*, 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components is described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Some embodiments of the present invention and variations thereof, relate to hair shaving devices for hard to reach and see areas of the body. In one embodiment of the present invention, the hair shaving device features an elongated neck, which may allow the device blades to easily and simply reach the entire back, and without a user having to twist or stretch. The handle is of an ergonomic design that may be allowed to be firmly gripped, so that the blade may be applied with full contact and needed pressure while the user still has comfortable manual control. The shaving device may include a digital camera. The camera communicates wirelessly with common smart devices by a mobile app, thus may allow a user to see the progress and missed spots during a shaving procedure, and may ensure that desired results are achieved. To enhance the visual achievements, the shaving device may further include a lighting piece, which may ensure full visibility of the progress and results during use.

In one embodiment, the shaving device may comprise a razor hosting section and an elongated handle that allows independent application to the back and other hard-to-reach areas of the body. A strategically-positioned digital camera lens and corresponding light pieces allow positioning and production of the razor to be viewed directly by the user on a smart device via an electronic application program.

In other embodiments, the shaving device features an elongated handle and a replaceable blade cartridge. A digital camera lens is strategically-placed behind the blade area of the handle, as is a set of light-emitting diodes (LEDs). Wiring is featured within the handle, connecting the camera lens and LEDs to a rechargeable battery that connects to a port at the opposite end of the handle from that of the blade. A wireless communication protocol is also featured within the handle, and connects by wire to the digital camera. A mobile application program, for downloading and use by a smart-device, is featured for receipt of video from the digital camera via said wireless communication protocol. A power switch is featured on the exterior of the handle. A rechargeable battery is featured within the handle, and is connected by wire to all power-dependent elements of the device. An electrical cord for recharging of the battery is also included. The handle may feature two distinct gripping areas, and each features rubber texture.

In further embodiments, an enhanced shaving device may allow an individual to personally see, reach and shave hard-to-reach areas, such as their back and lower legs. Built into the handle near the blade portion will be a compact, water-resistant, digital camera. Two strategically-placed Light Emitting Diodes are featured next to the camera to illuminate the shaving area. The LEDs may prevent shadowing and ensure visibility. The shaving device may feature an elongated, ergonomic handle which effectively increases the reach of the user. The handle includes two grip areas. Grip Area One is ergonomically-shaped and features grip-enhancing texture. The wide shape of Grip Area One and its texture allow the user to ensure the blade is appropriately positioned simply by fill of the grip area. Grip Area Two features strategically placed texture and is located near the blade. Grip Area Two allows the user to maintain great control of the razor when making minute movements such as when shaving around the knee. The blade-hosting portion of the invention fastens to a swivel head. The swivel head may allow the blade to move and contour in multi-directions as it moves along curves of the back, legs and other areas of the body. The swivel head features a spherical center with two (inner) slits in each side. A metal bracket surrounds the sphere and features two corresponding (outer) slits. Two support arms extend from an end portion of the handle and fasten into the (inner and outer) slits via screws. The sphere and the support arms riding up and down in the (inner and outer) slits to let the swivel head move and contour as needed. A downloadable application may allow for real-time streaming of the digital camera's broadcast, effectively allowing the user to view the shaving area upon their smart device.

In additional embodiments, the shaving device makes it easier to shave body hair from the back and other hard-to-reach areas. The shaving device may allow a user to independently perform such personal maintenance. The shaving device may allow a user to perform such personal maintenance privately and without aid from others. The shaving device may provide visibility of the area to be shaved. The shaving device provides visibility to an area that cannot ordinarily be independently seen. The shaving device provides this visibility through its digital camera. The shaving device enables this visibility to be witnessed through a smartphone or other application-capable device. The shaving device may enhance this visibility with included strategically-placed lighting. The shaving device may provide this visibility without need for the user to twist, bend, or stretch. By providing this visibility, the shaving device may ensure a user can directly see the specific area to be shaved. By providing this visibility, the shaving device may allow a user to see which specific areas are in need of shaving. By providing this visibility, the shaving device may ensure that a user does not skip or miss any area in need of shaving. By providing this visibility, the shaving device may allow a user to determine progress in the shaving process. By allowing a user to determine progress, time wasted by unnecessarily reapplying a razor to the same location that was already shaved may be eliminated.

In some embodiments, the handle of the shaving device is made of polypropylene, holds a centered radius curve of approximately twenty degrees (20°), and measures approximately eighteen inches (18") in length from endpoint to endpoint. The handle features an extended width as it nears Grip Area One. The bottom surface of Grip Area One features a rubberized texture. A charging port is located at the endpoint of the handle. Attachable to this port is an electrical cord for recharging of an internal battery, which connects to this port by wire. The internal battery is of lithium-ion (Li-ion) variety, and has power capabilities of three and seven-tenths volts (3.7 V). The port features a waterproof cap that can be used to seal said port when the electrical cord is not attached. The handle further features a second grip area, Grip Area Two, which is near the opposite length end of the handle as Grip Area One. A rubberized texture is featured on the top and bottom of Grip Area Two. A razor blade cartridge is attachable to the handle, and attaches to a swivel head to allow ergonomic pivoting of said blade during the shaving process. Featured behind the blade is a digital camera lens, and in a circumferential extension of the handle. This camera receives in approximately eight megapixels (8 mp) of clarity, and is set to auto-focus at zooming depth. The camera lens attaches by wire to an internal short-range wireless interconnection device kept within the handle. The wireless interconnection device may correspond to, and be received by, a mobile application program (or "app"). The app may be downloaded onto a communication device such as but not limited to a smartphone, iPhone®, notebook, laptop, tablet, etc. Featured next to the digital camera lens are two (2) light-emitting diodes (LEDs) of approximately six watts (6 W) each, and the LEDs broadcasts in a white color. The LEDs may connect to the internal battery by wire. The lens, interconnection device, and light-emitting diodes (LEDs) are all connected by wire to a power switch, which is featured externally on the base. The power switch features settings of mutual lens and LED operation, lens-only operation, and power off.

In alternative embodiments, the shaving device may not include electronic circuitry such as the LED lights, camera, on/off switch, and the rechargeable battery. In other embodiments, the shaving device may not include LED lights, camera, Grip Area Two, and the rechargeable battery.

In use, in a first step, download the application ("app") program to a smartphone or similar portable electronic device with a screen/monitor. After the download, in a second step, set the power switch to a mutual digital camera and a light-emitting diode operation. In a third step, maneuver the shaving device to the back area in need of shaving. By viewing the smartphone and using the shaving device, view the specific areas that may need shaving. In a third step, easily apply the razor of the shaving device to those areas, and witness the progress during shaving through use of the camera broadcast to the smart-device via the app. In a fourth step, should the area of use have adequate lighting, the user may set the shaving device for digital camera use only. If the area of use has inadequate lighting, the shaving device may be set to digital camera and a light-emitting diode operation. In a fifth step, when use of the shaving device is complete and/or the internal battery charge is low, it may be attached to its power cord for recharging of its internal battery.

The present invention will now be described in detail with reference to embodiments thereof as illustrated in the accompanying drawings.

FIG. 1 is an illustration of an exemplary shaving device 100, in accordance with an embodiment of the present invention. In the present embodiment shown, the hair shaving device 100 includes a charging cable 135 and an elongated, ergonomic handle 105. A predetermined length of the elongated, ergonomic handle 105 effectively increases the reach of the user. The elongated, ergonomic handle 105 includes a power switch 110 and two (2) grip areas 115 and 125. Grip Area One 115 is disposed on a first end portion of the handle 105, ergonomically-shaped, and features grip-enhancing textured material. The wide shape of Grip Area One or handle grip section 115 and its texture may allow the user to ensure the blade is appropriately positioned simply by feel of the grip area. Grip Area Two 125 features strategically-placed textured material 120 and is located near the blade/razor hosting section 130, on a proximate center segment of the handle 105. Grip Area Two allows the user to maintain great control of the blade/razor hosting section 130 when making minute movements such as when shaving around the knee.

In some embodiments, the handle 105 of the shaving device 100 is made of polypropylene, holds a centered radius curve of approximately twenty degrees (20°), and measures approximately eighteen inches (18") in length from endpoint to endpoint. The base of handle 105 features an extended width as it nears Grip Area One 115. The bottom surface of Grip Area One 115 features a rubberized texture. A charging port 605 (see FIG. 6) is located at the endpoint of the handle 105. Attachable to this port 605 is an electrical cord 135 for recharging of an internal battery 617 (see FIG. 6), which connects to this port 605 by wire. The internal battery 617 is of lithium-ion (Li-ion) variety, and has power capabilities of three and seven-tenths volts (3.7 V). The port 605 features a waterproof cap 610 (see FIG. 6) that may be used to seal the port 605 when the electrical cord 135 is not attached. The handle 105 further features a second grip area, Grip Area Two 125, which is near the opposite length end of the handle as Grip Area One 115. A rubberized texture is featured on the top and bottom of Grip Area Two 125. A razor/blade cartridge 130 is attachable to the handle 105, and attaches to a swivel head 205 (see FIG. 2) to allow ergonomic pivoting of said razor/blade cartridge 130 during the shaving process.

In additional embodiments, featured behind the razor/blade cartridge 130 is a digital camera lens 230 (see FIG. 2), and being disposed in a circumferential extension of the handle 105. The camera 230 may include an approximately eight megapixels (8 MP) of clarity, and is set to auto-focus at zooming depth. The camera lens 230 attaches by wire to an internal short-range wireless interconnection device kept within the handle 105. The short-range wireless interconnection device may include but not limited to, Bluetooth, Near-field communications (NFC), etc. Signals transmitted by the wireless interconnection device may correspond to, and be received by, a mobile application program (or "app") 710 (see FIG. 7) running in a communication/smart device 705 (see FIG. 7). The app 710 may be downloaded onto the communication/smart device 705 (see FIG. 7) such as but not limited to a smartphone, iPhone, notebook, laptop, tablet, etc. Featured next to the digital camera lens 230 are two (2) light-emitting diodes (LEDs) 225 (see FIGS. 2-3) of approximately six watts (6 W) each, and the LEDs 225 broadcasts in a white color. The LEDs 225 may connect to the internal battery 617 by wire. The lens 230, interconnection device, and light-emitting diodes (LEDs) 225 are all connected by wire to the power switch 110, which is featured externally on the base of the handle 105. The power switch 110 features operating settings of, but not limited to, first, mutual camera lens 230 and LED 225 mode of operation, second, camera lens 230 only mode of operation, and/or third, power off.

Figure 2:
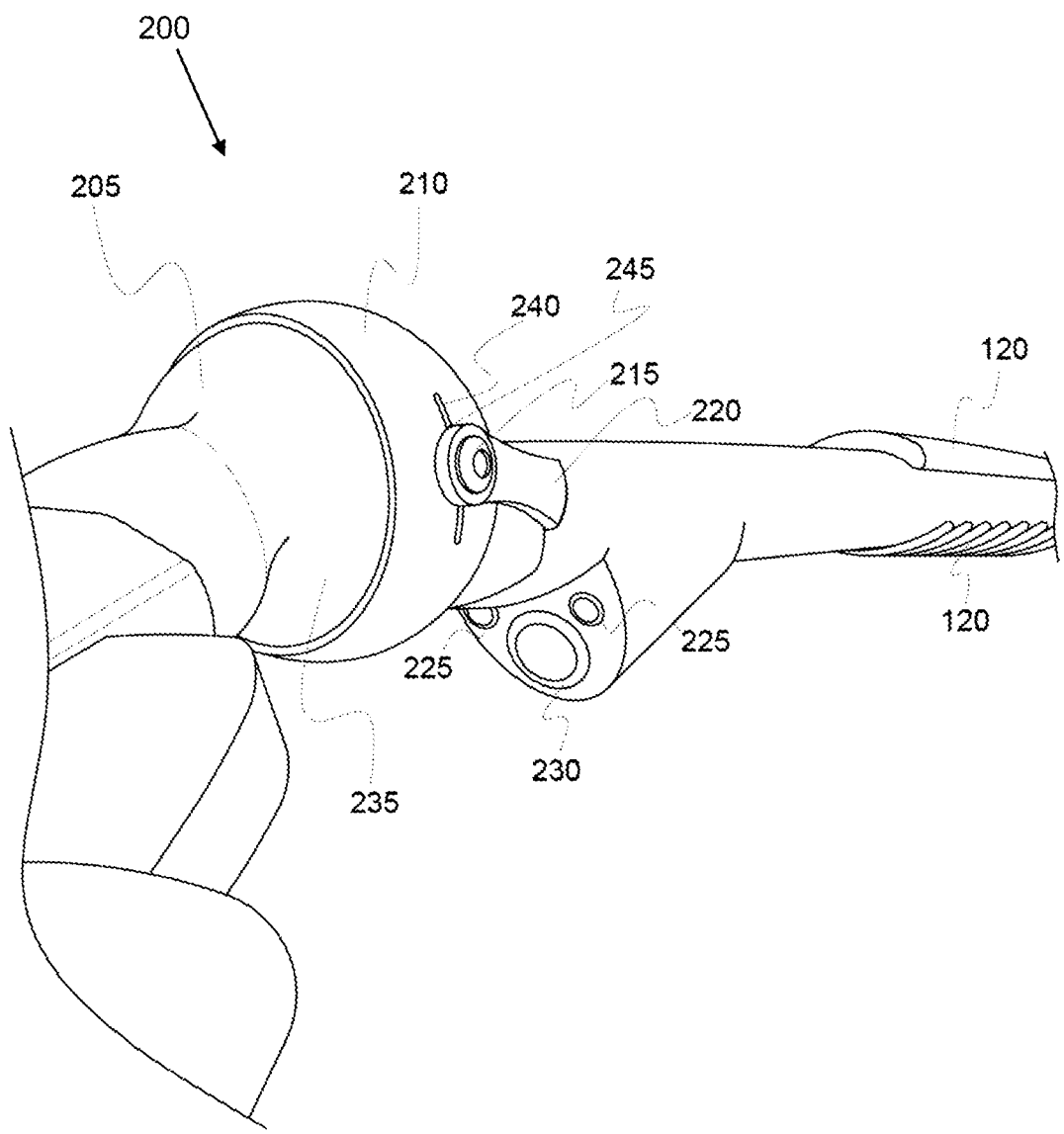
FIG. 2 is an illustration of an exemplary swivel head section, in accordance with an embodiment of the present invention.

FIG. 2 is an illustration of an exemplary swivel head implement 200, in accordance with an embodiment of the present invention. In the present embodiment shown, the swivel head implement 200 includes a swivel head 205, a support bracket 210, a support screw 215, a support arm implement 220, a pair of lighting pieces 225, a camera 230, and a spherical-shaped portion 235. The pair of lighting pieces 225 may comprise but not limited to, LEDs. The camera 230 may comprise of but not limited to digital, analog, and/or video camera. In some embodiments, built into the handle 105 near the blade portion 130 may include a compact, water-resistant, digital camera 230. Two strategically-placed light emitting diodes 225 are featured next to the camera 230 to illuminate the shaving area. The LEDs 225 may prevent shadowing and ensure visibility. The support arm implement 220 includes two support arms into engagement with the round support bracket 210. The blade/razor hosting section 130 fastens to the swivel head 205. The swivel head 205 allows the blade/razor hosting section 130 to move and contour in multi-directions as it moved along curves of the back, legs and other areas. The swivel head 205 features a spherical center 235 with two (inner) slits 240 in each side. A metal support bracket 210 surrounds the sphere 235 and features two corresponding (outer) slits 245. Two support arms 220 extend from the handle 105 and fasten into the (inner and outer) slits 240, 245 via support screws 215. The sphere 235 and the support arms 220 riding up and down in the (inner and outer) slits 240, 245 let the swivel head 205 move and contour as needed.

Figure 3:
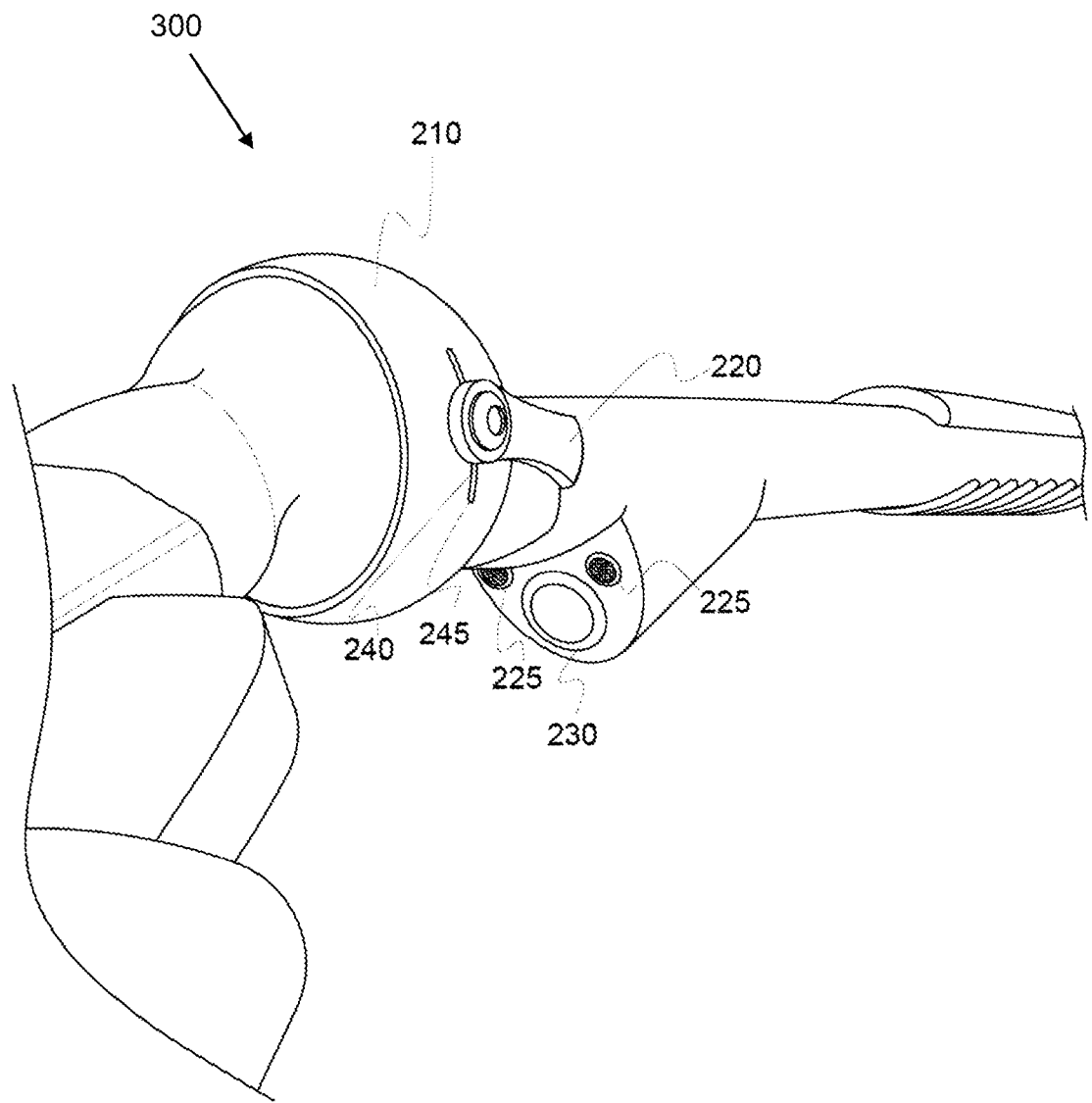
FIG. 3 is an illustration of an exemplary support arm section, in accordance with an embodiment of the present invention.

FIG. 3 is an illustration of an exemplary support arm section 300, in accordance with an embodiment of the present invention. In the present embodiment shown, the support arm section 300 includes a support arm 220 that is engaged with a support bracket 210 through a (inner and outer) slit portion 240, 245. The support arm implement 220 rides up and down in the (inner and outer) slit portion 240, 245 to allow the swivel head 205 to pivot. A pair of lighting pieces 225 is shown illuminated where the pair of lighting pieces is configured to ensure full visibility of a shaving progress and results during use. The swivel head 205 allows the blade/razor hosting section 130 to move and contour in multi-directions as it moved along curves of the back, legs and other areas. The swivel head 205 features a spherical center 235 with two slits 240 in each side. A metal support bracket 210 surrounds the sphere 235 and features two corresponding slits 245. Two support arms 220 extend from the handle 105 and fasten into the slits 240, 245 via support screws 215. The sphere 235 and the support arms 220 riding up and down in the (inner and outer) slits 240, 245 let the swivel head 205 move and contour as needed. In some embodiments, featured next to the digital camera lens 230 are two (2) light-emitting diodes (LEDs) 225 of more or less six watts (6 W) each, and the LEDs 225 broadcasts in, but not limited to, a white color. The LEDs 225 may connect to the internal battery 617 by wire. The lens 230, interconnection device, and light-emitting diodes (LEDs) 225 are all connected by wire to a power switch 110, which is featured externally on the base of the handle 105. The power switch 110 features settings of, but not limited to, mutual camera lens 230 and LED 225 mode of operation, camera lens 230 only mode of operation, and/or power off.

Figure 4:
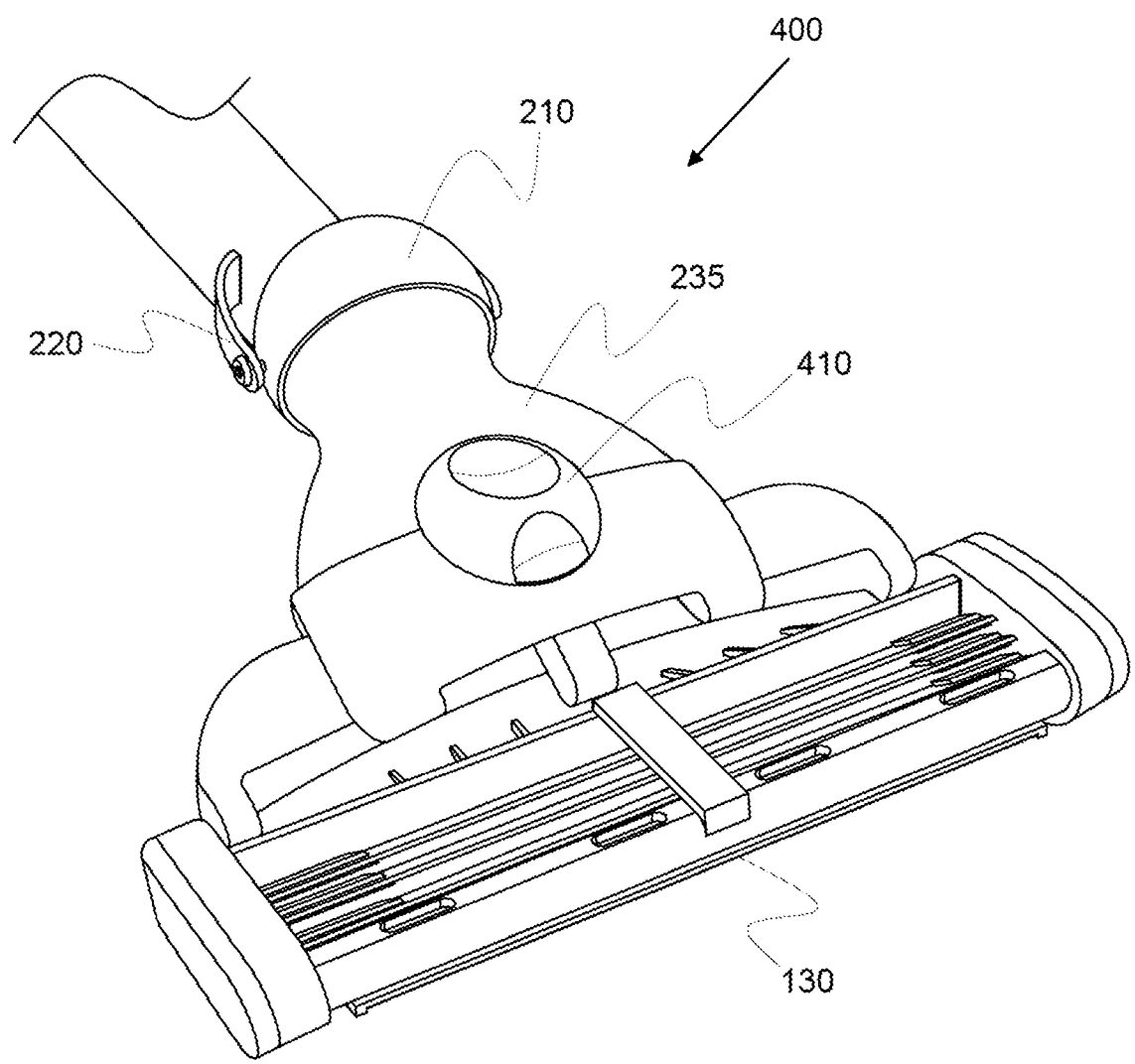
FIG. 4 is an illustration of an exemplary razor/blade section, in accordance with an embodiment of the present invention.

FIG. 4 is an illustration of an exemplary blade/razor hosting implement 400, in accordance with an embodiment of the present invention. In the present embodiment shown, the blade/razor implement 400 comprises a blade/razor hosting section release button 410, a blade/razor hosting section 130, a round support bracket 210, and a support arm 220. The blade/razor hosting section 130 fastens to the swivel head 205. The swivel head 205 allows the blade/razor hosting section 130 to move and contour in multi-directions as it moved along curves of the back, legs and other areas. The swivel head 205 features a spherical center 235 with two (inner) slits 240 in each side. A metal support bracket 210 surrounds the sphere 235 and features two corresponding (outer) slits 245. Two support arms 220 extend from the handle 105 and fasten into the (inner and outer) slits 240, 245 via support screws 215. The sphere 235 and the support arms 220 riding up and down in the (inner and outer) slits 240, 245 let the swivel head 205 move and contour as needed.

Figure 5A:
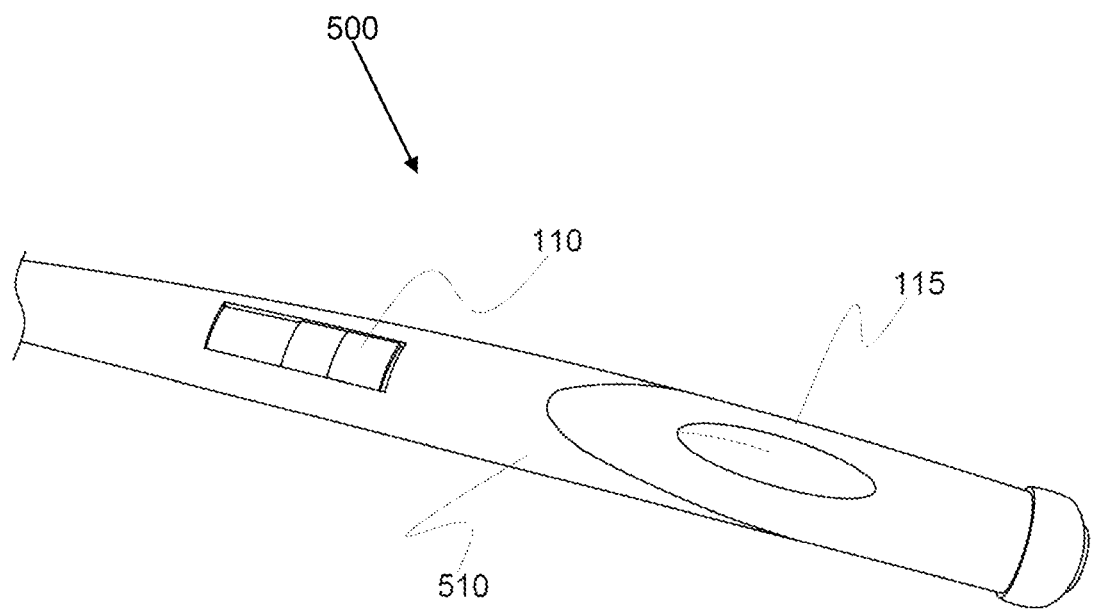
FIG. 5a and FIG. 5b are illustrations of an exemplary end portion of a handle area, in accordance with an embodiment of the present invention.
Figure 5B:
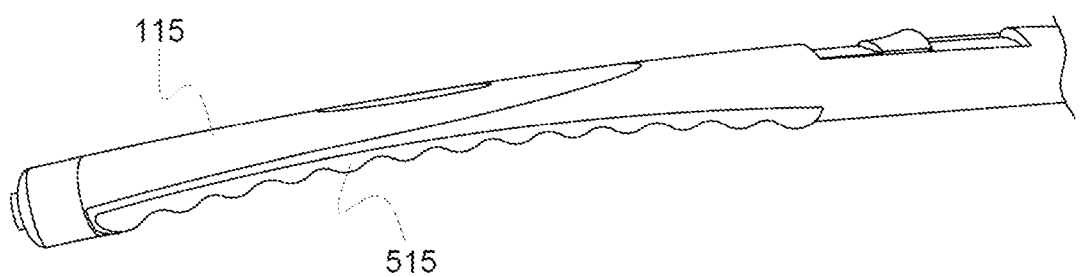

FIG. 5a and FIG. 5b are illustrations of an exemplary end portion of a handle area 500, in accordance with an embodiment of the present invention. In the present embodiment shown, in FIG. 5a, an end portion of a handle area 500 may include a handle grip area 115, an on/off switch 110, a broad grip area 510 where broadness allows more control when shaving hard to reach areas. In FIG. 5b, a grip-enhancing textured rubber material 515 is shown disposed on a proximate underside of the handle grip area 115. In some embodiments, handle 105 features an extended width as it nears Grip Area One 115. The bottom surface of Grip Area One 115 features a rubberized texture material 515. The handle 105 further features a second grip area, Grip Area Two 125, which is near the opposite length end of the handle as Grip Area One 115. A rubberized texture is featured on the top and bottom of Grip Area Two 125.

Figure 6A:
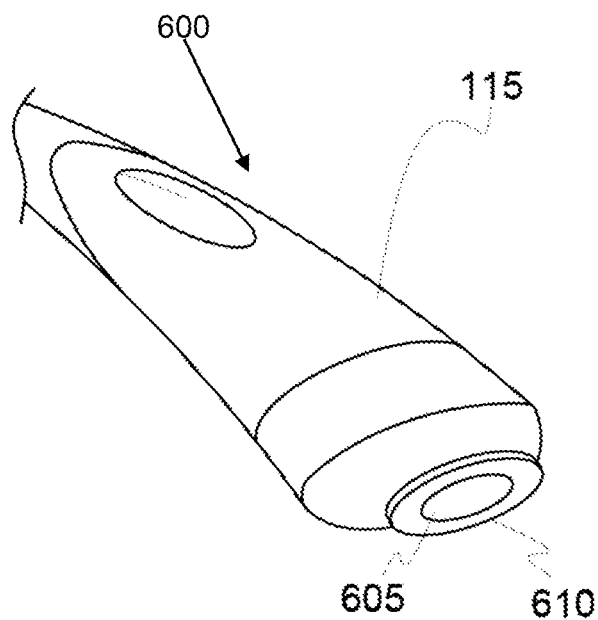
FIG. 6a and FIG. 6b are illustrations of an exemplary charging section, in accordance with an embodiment of the present invention.
Figure 6B:
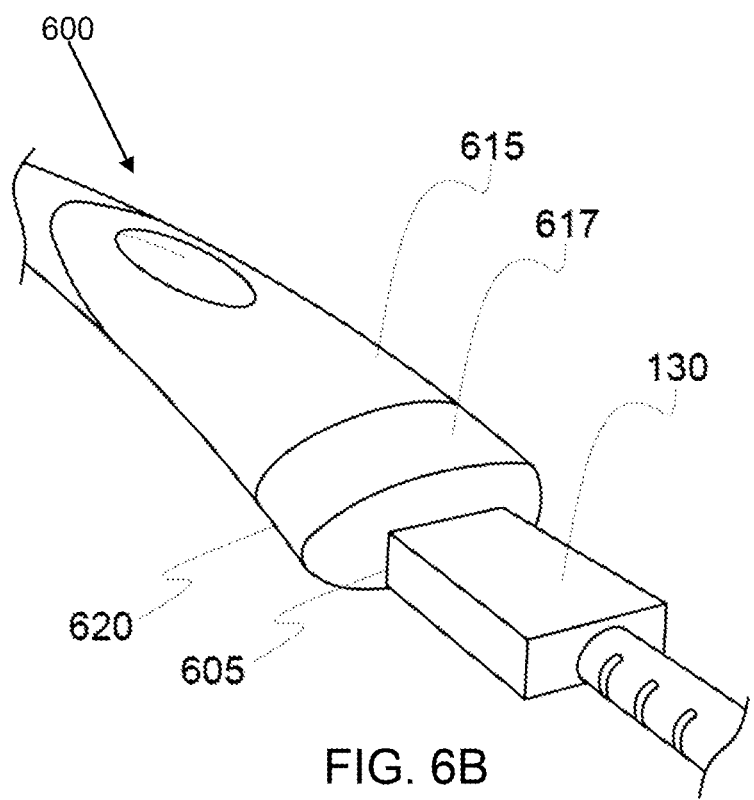

FIG. 6a and FIG. 6b are illustrations of an exemplary charging section 600, in accordance with an embodiment of the present invention. In the present embodiment, in FIG. 6a, the charging section 600 is shown disposed on an end portion of handle grip section 115. The charging section 600 may include a charging port 605 covered with a waterproof cap 610. In FIG. 6b, a charging cable 130 is shown plugged in the charging port 605. In some embodiments, the proximate end portion of handle grip section 115 may include a battery housing 615 for containing internal batteries, a removable end cap 620 to allow a replacement of the batteries in case the batteries go bad. The batteries may comprise rechargeable batteries. In some embodiments, the base of handle 105 features an extended width as it nears Grip Area One 115. The bottom surface of Grip Area One 115 features a rubberized texture. A charging port 605 is located at the endpoint of the handle 105. Attachable to this port 605 is an electrical cord 135 for recharging of an internal battery 617, which connects to this port 605 by wire. The internal battery 617 is of lithium-ion (Li-ion) variety, and has power capabilities of three and seven-tenths volts (3.7 V). The port 605 features a waterproof cap 610 that may be used to seal the port 605 when the electrical cord 135 is not attached.

Figure 7:
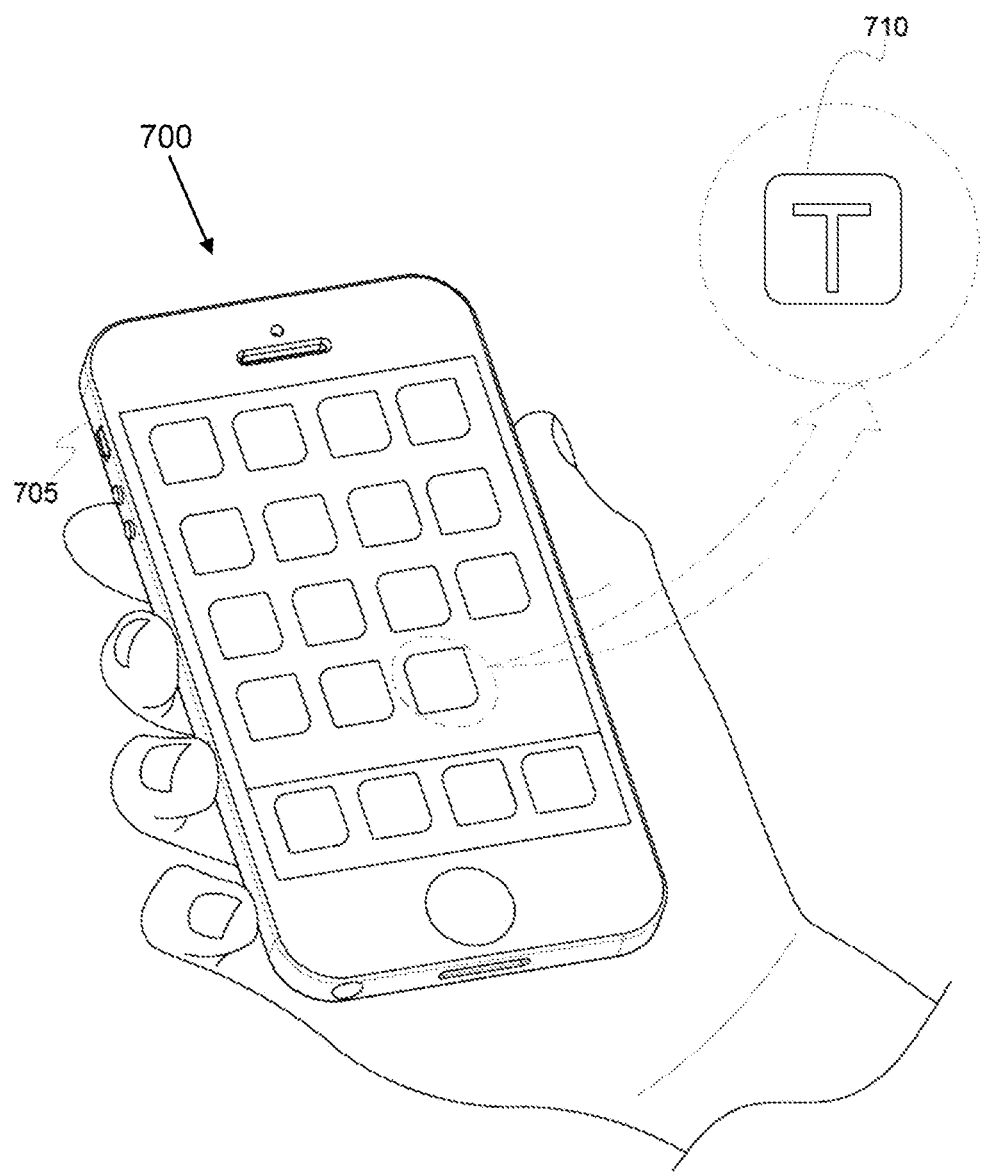
FIG. 7 is an illustration of an exemplary smart device running an app icon, in accordance with an embodiment of the present invention.

FIG. 7 is an illustration of an exemplary smart device for running an app 700, in accordance with an embodiment of the present invention. In the present embodiment shown, a smart device 705 may run an app 710 that is configured to interface with the hair shaving device 100. The app 710 may include a downloadable application which may allow for real-time streaming of the digital camera's 230 broadcast, effectively allowing the user to view the shaving area upon their smart device 705. The smart device 705 may include electronic devices with a display screen, but not limited to, smartphones, cellphones, mobile phones, laptop, iphones, etc.

In use, in a first step, download the application ("app") program 710 to a smartphone or similar portable electronic device with a screen/monitor 705. After the download, in a second step, set the power switch to a mutual digital camera and a light-emitting diode operation. In a third step, maneuver the shaving device to the back area in need of shaving. By viewing the smartphone 705 and using the shaving device, view the specific areas that may need shaving. In a third step, easily apply the razor of the shaving device to those areas, and witness the progress during shaving through use of the camera broadcast to the smart device 705 via the app 710. In a fourth step, should the area of use have adequate lighting, the user may set the shaving device for digital camera use only. If the area of use has inadequate lighting, the shaving device may be set to digital camera and a light-emitting diode operation. In a fifth step, when use of the shaving device is complete and/or the internal battery charge is low, it may be attached to its power cord for recharging of its internal battery.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing shaving devices according to the present invention will be apparent to those skilled in the art. Various aspects of the invention have been described above by way of illustration, and the specific embodiments disclosed are not intended to limit the invention to the particular forms disclosed. The particular implementation of the shaving device may vary depending upon the particular context or application. By way of example, and not limitation, the shaving device described in the foregoing were principally directed to independent shaving of hard to reach areas of the body implementations; however, similar techniques may instead be applied to cooperative shaving hard to reach areas of the body, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A device comprising:
   a razor hosting portion, said razor hosting portion comprises a combination of one or more blades that are configured to be operable for removing unwanted hair;
   a handle implement, in which said handle implement comprises an elongated handle that is configured to be operable for increasing a reach of a user;
   a camera implement, wherein said camera implement is configured to capture an area serviced by said razor hosting portion;
   a lighting piece implement, said lighting piece implement comprises at least one of, a light emitting diode implement, wherein said lighting piece implement is configured to illuminate said area serviced by said razor hosting portion;
   a first gripping area disposed on a base of said handle implement, in which said first gripping area includes a grip enhancing texture material;
   a swivel head section, said swivel head section includes a swivel head with a spherical portion, wherein said swivel head section is configured to allow said razor hosting portion to move and contour in multiple directions;
a support bracket, said support bracket is configured to surround said swivel head spherical portion; and
a support arm implement extending from an end portion of said handle implement, wherein said support arm implement is configured to engage said swivel head section;
a second gripping area disposed on a proximate midsection of said handle implement, said second gripping area is configured to allow or maintain significant control of said razor hosting portion when making minute movements;
in which said support arm implement comprises two support arms configured to engage two sides of said swivel head section.

2. The device of claim 1, further comprising at least two inner slit portions disposed on both sides of said spherical portion of said swivel head.

3. The device of claim 2, further comprising at least two outer slit portions disposed on both sides of said support bracket.

4. The device of claim 1, further comprising an electronic device having a downloadable software application, said downloadable software application is configured to run on said electronic device, said electronic device comprises at least one of, a smartphone, a mobile phone, a laptop, a portable computer, and an electronic device.

5. The device of claim 4, wherein said software application is configured to be operable for real-time streaming of a broadcast of said camera implement, wherein said broadcast is configured to be operable for allowing the user to view a shaving area upon said electronic device.

6. The device of claim 5, further comprising a short-range wireless interconnection device that is configured to transmit said broadcast of said camera implement.

7. The device of claim 6, in which said lighting piece implement comprises at least two LED lighting pieces that are configured to illuminate said area serviced by said razor hosting portion.

8. The device of claim 1, further comprising a power switch, said power switch comprises at least three modes of operation settings including camera implement and lighting piece implement mode of operation, camera implement only operation, and power on/off.

9. The device of claim 8, in which said grip enhancing texture material comprises at least one of, rubber and plastic material.

10. The device of claim 1, further comprising a rechargeable battery, said rechargeable battery is configured to provide power to said camera implement and lighting piece implement; and a battery housing, said battery housing is configured to enclose said rechargeable battery.

11. The device of claim 10, further comprising:
a charging section, said charging section is configured to charge said rechargeable battery, in which said charging section comprises a charging port that is configured to enable charging power to reach said rechargeable battery;
a waterproof cap, said waterproof cap is configured to cover said charging port; and
a charging cable, wherein said charging cable is configured to plug to said charging port to enable charging power to reach said rechargeable battery.

12. A device comprising:
a razor hosting portion, said razor hosting portion comprises a combination of one or more blades that are configured to be operable for removing unwanted hair;
a handle implement, in which said handle implement comprises an elongated handle that is configured to be operable for increasing a reach of a user;
a camera implement, wherein said camera implement is configured to capture an area serviced by said razor hosting portion;
a lighting piece implement, said lighting piece implement comprises at least one of, a light emitting diode implement, wherein said lighting piece implement is configured to illuminate said area serviced by said razor hosting portion;
a first gripping area disposed on a base of said handle implement, in which said first gripping area includes a grip enhancing texture material;
a swivel head section, said swivel head section includes a swivel head with a spherical portion, wherein said swivel head section is configured to allow said razor hosting portion to move and contour in multiple directions;
a support bracket said support bracket is configured to surround said swivel head spherical portion; and
a support arm implement extending from an end portion of said handle implement, wherein said support arm implement is configured to engage said swivel head section; and
at least a support screw implement, said support screw implement comprises at least two support screws configured to fasten said support arm implement to said swivel head section.

13. The device of claim 12, in which said at least two support screws are configured to engage at least two inner slit portions disposed on both sides of said swivel head section.

14. The device of claim 13, in which said at least two support screws are further configured to engage at least two outer slit portions disposed on both sides of said support bracket.

15. The device of claim 14, in which said support bracket comprises at least one of, a metal support bracket and a plastic support bracket.

16. A device consisting of:
means for removing unwanted hair;
means for increasing a reach of a user;
means for capturing an area serviced by said hair removing means;
means for illuminating said area serviced by said hair removing means;
means for enhancing a grip on said reach increasing means;
means for allowing said hair removing means to move and contour in multiple directions;
means for surrounding said multiple direction movement allowing means;
means for engaging said multiple direction movement allowing means;
means for providing different modes of operation; and
means for viewing said area serviced by said hair removing means.

17. A device comprising:
a razor hosting portion, said razor hosting portion comprises a combination of one or more blades that are configured to be operable for removing unwanted hair;

a handle implement, in which said handle implement comprises an elongated handle that is configured to be operable for increasing a reach of a user;

a camera implement, wherein said camera implement is configured to capture an area serviced by said razor hosting portion;

a lighting piece implement, said lighting piece implement comprises at least one of, a light emitting diode implement, wherein said lighting piece implement is configured to illuminate said area serviced by said razor hosting portion;

a first gripping area disposed on a base of said handle implement, in which, said first gripping area includes a grip enhancing texture material;

a swivel head section, said swivel head section includes a swivel head with a spherical portion, wherein said swivel head section is configured to allow said razor hosting portion to move and contour in multiple directions;

a support bracket, said support bracket is configured to surround said swivel head spherical portion;

a support arm implement extending from an end portion of said handle implement, wherein said support arm implement is configured to engage said swivel head section, in which said support arm implement comprises two support arms configured to engage two sides of said swivel head section; and a power switch, said power switch comprises at least three mode of operation settings including camera implement and lighting piece implement mode of operation, camera implement only operation, and power on/off.

18. The device of claim 17, further comprising:

at least two inner slit portions disposed on both sides of said spherical portion of said swivel head;

at least two outer slit portions disposed on both sides of said support bracket; and a support screw implement, said support screw implement comprises at least two support screws configured to fasten said support arm implement to said swivel head section via said at least two inner slit portions and at least two outer slit portions.

* * * * *